United States Patent
Shimura et al.

(10) Patent No.: US 6,947,973 B2
(45) Date of Patent: Sep. 20, 2005

(54) CONTENT SUPPLY APPARATUS FOR TRANSMITTING THE CONTENT TO A PORTABLE TERMINAL IN TRANSMITTED DIVIDED UNITS AND PREFETCHING OTHER CONTENTS FROM THE TRANSMITTED DIVIDED UNITS

(75) Inventors: Satoshi Shimura, Tokyo (JP); Yoshinori Saida, Tokyo (JP)

(73) Assignee: NEC Corporation, Tokyo (JP)

( * ) Notice: Subject to any disclaimer, the term of this patent is extended or adjusted under 35 U.S.C. 154(b) by 574 days.

(21) Appl. No.: 09/725,894

(22) Filed: Nov. 30, 2000

(65) Prior Publication Data

US 2001/0003194 A1 Jun. 7, 2001

(30) Foreign Application Priority Data

Dec. 1, 1999 (JP) .......................... 11-342053

(51) Int. Cl.[7] .............................. G06F 15/16
(52) U.S. Cl. .................. 709/217; 709/203; 709/219
(58) Field of Search ............................ 709/203, 217, 709/219, 200

(56) References Cited

U.S. PATENT DOCUMENTS

| 5,895,471 | A |   | 4/1999  | King ......................... 707/104 |
|-----------|---|---|---------|----------------------------------------|
| 5,978,841 | A |   | 11/1999 | Berger                                 |
| 6,035,281 | A | * | 3/2000  | Crosskey et al. ............. 705/14    |
| 6,085,193 | A | * | 7/2000  | Malkin et al. ................. 707/10  |
| 6,098,064 | A | * | 8/2000  | Pirolli et al. .................... 707/2 |
| 6,272,598 | B1| * | 8/2001  | Arlitt et al. .................. 711/133 |
| 6,282,542 | B1| * | 8/2001  | Carneal et al. ............... 707/10   |
| 6,385,641 | B1| * | 5/2002  | Jiang et al. ................. 709/203  |
| 6,665,838 | B1| * | 12/2003 | Brown et al. ............ 715/501.1     |

FOREIGN PATENT DOCUMENTS

| JP | 6-110926     | 4/1994    |
|----|--------------|-----------|
| JP | 8-87526      | 4/1996    |
| JP | 11-149405    | 6/1999    |
| JP | 411175426 A * | 7/1999   |
| WO | WO 97/44747  | 11/1997   |
| WO | WO 97/49044  | 12/1997   |

OTHER PUBLICATIONS

European Office Action dated Mar. 19, 2004.
T. Bickmore, et al.: Web Page Filtering and Re–Authoring for Mobile Users', *The Computer Journal*, Apr. 21, 1999, vol. 42, No. 6, pp. 534 to 546, XP000920338.
European Search Report dated May 16, 2003.
Zheng Wang, et al., "Prefetching in World Wide Web", *Department of Computer Science, University College London*, IEEE, Nov. 18, 1996, pp. 28–32.

* cited by examiner

*Primary Examiner*—Nabil El-Hady
(74) *Attorney, Agent, or Firm*—McGinn & Gibb, PLLC

(57) ABSTRACT

A content supply apparatus is interposed between a portable terminal and a content server, to obtain content demanded by the portable terminal and transmit the obtained content to the portable terminal. A content holding section holds content obtained from the content server. A content supply section obtains the demanded content from the content holding section if the demanded content is there, or from the content server, and transmits the demanded content to the portable terminal. In a preferred embodiment, the content supply section transmits the content in divided content units of a maximum information amount that can be displayed by the portable terminal. In another embodiment, a prefetching section prefetches other content, referred from the transmitted divided content units, and stores the prefetched content in the content holding section.

5 Claims, 15 Drawing Sheets

CONTENT SUPPLY APPARATUS FOR TRANSMITTING THE CONTENT TO A PORTABLE TERMINAL IN TRANSMITTED DIVIDED UNITS AND PREFETCHING OTHER CONTENTS FROM THE TRANSMITTED DIVIDED UNITS

FIELD OF THE INVENTION

The present invention concerns a content supply apparatus, interposed between a portable terminal and a content server, for obtaining content demanded by the portable terminal to obtain and sending to the portable terminal.

BACKGROUND OF THE INVENTION

In general, a portable terminal provided with radio communication function, obtains HTML file, image file, sound file or other contents on a content server according to the following procedures.

First, the portable terminal transmits a content acquisition demand specifying the URI (Universal Resource Identifier) to the gateway server by radio communication, The gateway server obtains the specified content from the content server specified in the URI. Here, the gateway server and the content server are network connected by Internet or the like. The gateway server that has obtained the content, transmits the content to the portable terminal. Upon the reception of content, the portable terminal display this content using an information display on the portable terminal. The content sometimes includes a plurality of URI format link information to the other contents, and if the user operation selects on of them, the selected content is obtained again.

Here, both the communication from the portable terminal to the gateway server and the communication from the gateway server to the content server are low in communication amount; therefore, most of time required for content acquisition is occupied by the transmission time of content from the content server to the gateway server and the transmission time of content by radio communication from the gateway server to the terminal.

On the other hand, as for a general client terminal which is not a portable terminal, as a technology for reducing the time from the content acquisition demand emitted by the user to the actual display of that content on the client terminal, there is a technology to prefetch previously contents that can be asked by the client to obtain. This technology is classified roughly into a first method for storing in the portable terminal and a second method for storing in the gateway server (or proxy server).

As an example of the prefetch technology of the first method, the Japan Patent Publication HEI 6-110926 proposes a technology for investigating link information in the content displayed actually on the portable terminal, and prefetching by the portable terminal the content on the content server contained in the link information before the link is specified by the user, and holding in the portable terminal. When a next content is demanded to be obtained by the user operation, a rapid response is realized by displaying the demanded content, if it exists in a group of prefetched contents in the terminal. On the other hand, the Japan Patent Publication HEI 8-87526 proposes a technology for reducing the necessary memory on the terminal side compared to prefetch the whole contents, by giving priority order based on the user operation history or the like on the client terminal side or the server side, when the terminal prefetch the content, and prefetching only those of high priority and holding on the terminal side.

As an example of the prefetch technology of the second method, the Japan Patent Publication HEI 11-149405 proposes a technology for prefetching the content referred to by the content asked by the terminal to obtain and caching in the server side. Moreover, a technique to reduce the content to prefetch by giving priority to each cached content according to its request frequency, and prefetching based on the priority of the content asked by the user to obtain or the importance of that user. For instance, if the priority of the content asked by the user to obtain if "high", the whole contents referred to by this content are prefetched or reloaded, and if the priority is "middle", only already cached content among contents referred to by this content is reloaded, and it the priority is "low", only content already cached and having "high" priority among contents referred to by this content is reloaded. Here, "reload" means the processing of replacing already cached content with the newest original content on the content server, and "prefetch" means the processing of obtaining non cached content from the content server and caching the same.

SUMMARY OF THE INVENTION

An inconvenience of the prior art consists in that, for a portable terminal, it takes long time from the content acquisition operation by the user to the actual display of the content, compared to a large personal computer, such as ordinary lap-top terminal, or the like. This is because the radio communication speed is generally slower than the wire communication speed, and the transfer itself of the contents takes much time. Moreover, in case of portable terminal, the screen size, memory capacity or other factors limit the information amount that can be displayed at one time, and the gate server can not send the content demanded by the portable terminal to obtain as it is, but it should send by dividing it into a unit of information amount that can be displayed, and this supplementary division processing also take as much time.

Another inconvenience of the prior art is that there is no content prefetching technology effective for reducing the time from the content acquisition operation by the portable terminal user to the actual display of the content. This is because, among content prefetching technologies mentioned for the prior art, the first method to hold the prefetched content on the terminal is limited in the memory capacity if applied to the portable terminal. Since little capacity can be used to hold the content, it can hardly be applied. As for the second method to store the prefetched content at the gateway server, if applied as proposed conventionally, the amount of useless prefetched content increases, and therefore, the traffic load increases. This is because, as this conventional prefetching technology prefetches by content unit requested by the user, contents linked in the requested content, but useless and so not transmitted to the portable terminal, are also prefetched.

Therefore, it is an object of the present invention is to reduce the time from the content acquisition operation by the portable terminal user to the actual transmission to the portable terminal and display of the content.

Another object of the present invention is to avoid useless content prefetching.

DESCRIPTION OF THE PREFERRED EMBODIMENTS

The present invention concerns a content supply apparatus such as gateway server or proxy server, interposed between a portable terminal and a content server, for obtaining content demanded by the portable terminal to obtain and sending to the portable terminal, comprising a content hold means for holding the content obtained from the content server; a divided content supply means for obtaining the content demanded by the portable terminal from said content hold means if the same exists in said means, and from the content server if the same does not exist, and transmitting to the portable terminal by divided content unit of every information amount that can be displayed by the portable terminal; and a prefetcher means for prefetching the other contents referred from said divided content, by transmitted divided content unit, from the content server, and storing in said content hold means. Thus, by divided content unit which is transmitted to the portable terminal, carrying out other content prefetching which is refer from divided content, the present invention avoids useless content prefetching and reduces the time to the actual transmission to the portable terminal display of the content.

Moreover, the present invention comprises a link information format conversion section for mutual conversion of URI format link information and ID number format link information; and said divided content supply means transmits link information in the divided content to be transmitted to the portable terminal by substituting entirely with ID number format by said link information format conversion section, obtains the corresponding URI by said link information format conversion section, when the portable terminal demands to obtain content in ID number format. This allows to reduce the information amount to be transferred compared to the exchange of URI format link information between the portable terminal and the content supply apparatus, reduce the communication time and economize the communication cost.

Further, in the present invention, if the content to prefetch is either the content under pay content access restriction, or the content that could not be prefetched due to network trouble or other reason, said prefetcher means stores that message in said content hold means matching off against the concerned content URI, and said content division means, upon the reception of said message during the search of the content demanded by the portable terminal to obtain from said content hold means, transmits the message to the portable terminal. This allows the portable terminal user to know beforehand the content in trouble, pay content, or access limited content, and to dispense with useless access and useless payment of communication fee.

Now, examples of embodiment of the present invention will be described in detail with reference to the accompany drawings.

[First Embodiment]

Figure 1:
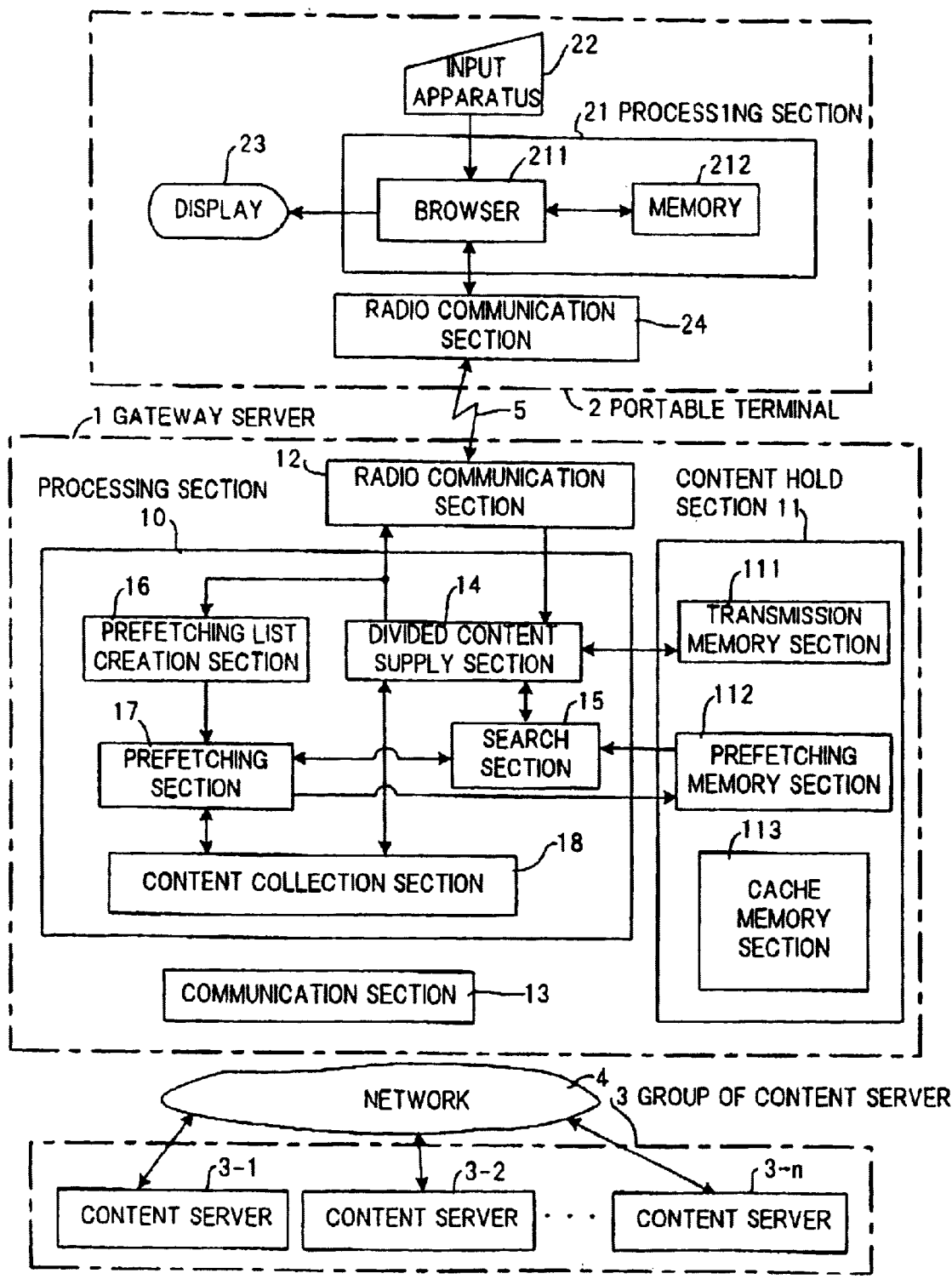
FIG. 1 is a composition diagram of a first embodiment of the content supply apparatus to which the present invention is applied.

Referring to FIG. 1, a first embodiment of the content supply apparatus applying the present invention comprises a gateway server 1 composing the content supply apparatus, a portable terminal 2 receiving content supply, and a group of content servers 3 including a plurality of content servers 3-1 to 3-n accumulating contents to be supplied, the gateway server 1 and the group of content servers 3 are connected by wire or radio through a network 4 such as Internet of the like, and the portable terminal 2 and gateway server 1 are connected through a radio line 5.

Each of content servers 3-1 to 3-n accumulates a number of contents. In this embodiment, respective content is HTML file. Each content is identified uniquely by the URI allocated to the same. Besides, link information for referring to the other contents is embedded in respective content. The link information specifies the URI of the content to refer.

The portable terminal 2 comprises a processing section 21 running by a program, an input apparatus 22 connected to the same, a display 23 and a radio communication section 24. The input apparatus 22 is composed of numeric keys or a keyboard, while the display 23 is composed of a LCD or the like. The radio communication section 24 via the radio line S, communicates with the gateway server 1 and comprises modem, amplifier or antenna. The processing section 21 controls whole the portable terminal 2, and comprises a CPU, a RAM for memorizing the program, or the like. The processing section 21 comprises a browser 211 and a memory 212 for content memorization, as parts concerning the content supply. The portable terminal 2 may be a terminal dedicated to the content display, or a terminal having the other functions as portable telephone function.

The gateway server 1 comprises a processing section 10 running by a program, a content hold section 11 connected to the same, a radio communication section 12 and a communication section 13. The processing section 10 comprises a CPU, a RAM for memorizing the program, or the like, and includes, as functional means realized by them, divided content supply section 14, search section 15, prefetching list creation section 16, prefetching section 17 and content collection section 18.

The radio communication section 12 communicates with the portable terminal 2 through the radio line 5 and comprises modem, amplifier or antenna. The communication section 13 communicates with an arbitrary content server of the group of content servers 3 through the network 4 and comprises modem, amplifier or antenna.

The content hold section 11 accumulates temporarily contents collected from the group of content servers 3, and is composed of a magnetic disk device, for example. The content hold section 11 a transmission memory section 111, a prefetching memory section 112 and a cache memory section 113. The transmission memory section 111 holds only contents actually supplied to the portable terminal 2. The prefetching memory section 112 holds only the prefetched content, among the other contents referred to from the content held in the transmission memory section 111 and a cache memory section 113 holds the content that has been obtained by the portable terminal 2 in the past. In short of area to store new content, this cache memory section 113 secures the area by discarding contents that have not been referred to for the longest time, by an exchange algorithm of LRU format.

The divided content supply section 14 divides the content that the portable terminal demanded to obtain into a unit of information amount that can be displayed by the portable terminal or processes otherwise, and supplies the portable terminal with content by the divided unit. Individual unit obtained by the content division shall be called "divided content" in this Specification.

The prefetching list creation section 16 input the divided content that the divided content supply section 14 has actually supplied to the portable terminal 2, detects link information to the other contents embedded therein, and creates a prefetching list enumerating URIs of the other contents to prefetch. The prefetching section 17 prefetches contents based on the URI described in this prefetching list. The prefetched content is stored in the prefetch memory section 112 of the content hold section 11.

The search section 15 searches for the content having the desired URI in the content hold section 11 and is used by the divided content supply section 14 and the prefetching section 17. The content collection section 18 collects the content having the desired URI from the group of content servers 3 through the communication section 13 and the network 4 and is used by the divided content supply section 14 and the prefetching section 17.

FIG. 2 to FIG. 5 are flow charts showing processing examples of the gateway server 1 and now, the operation of this embodiment will be described referring to FIG. 1 to FIG. 5. The system operation shall be described from the initial state where the hold section 11 of the gateway server 1 holds no content.

When the browser 211 is started through the operation of the input apparatus 22 by the portable terminal 2 user, the browser 211 displays the browser screen on the display 23 and waits for the user operation. When the user specifies the connection destination URI and specifies the execution, the browser 211 transmits a new content acquisition demand including an terminal ID identifying uniquely the specified URI and the portable terminal 2 to the gateway server 1 through the radio communication section 24 via the radio line 5.

Upon the reception of new content acquisition demand from the portable terminal 2 (S1), the radio communication section 12 of the gateway server 1, transmits the same to the divided content supply section 14. The divided content supply section 14 judges the new content acquisition demand, and searches if the content of that URI is stored in the content hold section 11 using the search section 15 (S2). In the initial state, as the content does not exist, the divided content supply section 14 accesses the content defined uniquely in the concerned URI of the content server specified by that URI, using the content collection section 18 (S8). Beforehand, if the content is stored in the transmission memory section 111, it is transferred to the cache memory section 113 (S6) and the prefetching memory 112 is cleared (S7).

If the desired content could not be obtained due to content server down or by other reasons (NO in S9), the divided content supply section 14 transmits an error message announcing it to the portable terminal 2 through the radio communication section 12 (S10) and terminates the processing. On the portable terminal 2, the browser 211 displays the error message on the display 23.

If the desired content is obtained (YES in S9), the divided content supply section 14 searches for a table (not shown) registering the pair of the terminal ID and the terminal environment information (amount of information that can be displayed at one time, number of colors that can be displayed, or the like) with the terminal ID demanding the content acquisition, obtains the environment information of the portable terminal 2 demanding the content acquisition, and processes the content based on the same (S11). For example, the number of display colors of that content is reduced equal or interior to the number of colors that can be displayed by the portable terminal 2, and the content is divided into unit of information amount that can be displayed by the portable terminal 2. Then, respective divided content is stored in the transmission memory section 111 of the content hold section 11 (S12) and the divided content corresponding to the leading head of the content and the terminal ID of the portable terminal 2 demanding the divided content are delivered to the radio communication section 12, and the radio communication section 12 sends the divided content to the portable terminal 2 through the radio line 5 (s21 of FIG. 3).

In the portable terminal 2, a browser 211 memorizes temporarily the divided content received by the radio communication section 24 in a memory 212, and then displays on the browser screen of the display 23. On the other hand, when the divided content supply section 14 delivers the divided content and the terminal ID to the radio communication section 12, the prefetching list creation section 16 of the gateway server 1 side inputs the same, and detects all link information to the other contents in that divided content (S22). For example, in case of HTML file, the description <A href="URI" is detected. If no link information is detected, (NO in S23), the processing is terminated, and it one or more link information is/are detected, a prefetching list enumerating URIs in respective link information is established (S24), and delivered to the prefetching section 17 with the terminal ID.

The prefetching section 17 proceeds as follows for each URI described in the prefetching list. First, it searches if the content of that URI is stored in the content hold section 11 using the search section 15 (S31). In the initial state, as the content does not exist, the prefetching section 17 accesses the content specified by the concerned URI of the content server specified by that URI, using the content collection section 11 (S34). If the access has failed due to some trouble (content server failure, URL description error, network trouble) (S35), it is retried several times, and if the access still remains unsuccessful (S36), the message reporting the same is stored in the prefetching memory 112 matching off with the URI (S37). If the access is successful, (S35, S36), when the content is pay content or access limited membership content (YES in S38), only the message announcing the pay content of the access limitation is stored in the prefetching memory 112 matching off with the URI (S37). On the other hand, if it is an access free content free of charge (NO in S38), the content is obtained actually (S39). Then, the environment information corresponding to the terminal ID from a now shown table, the content is processed based on the same similarly as processed by the divided content supply section 14 (S40), and respective divided content is stored in the prefetching memory section 112 (S41). The aforementioned prefetching processing is repeated until there will be no more non processed link information in the prefetching list (S42).

Figure 6:
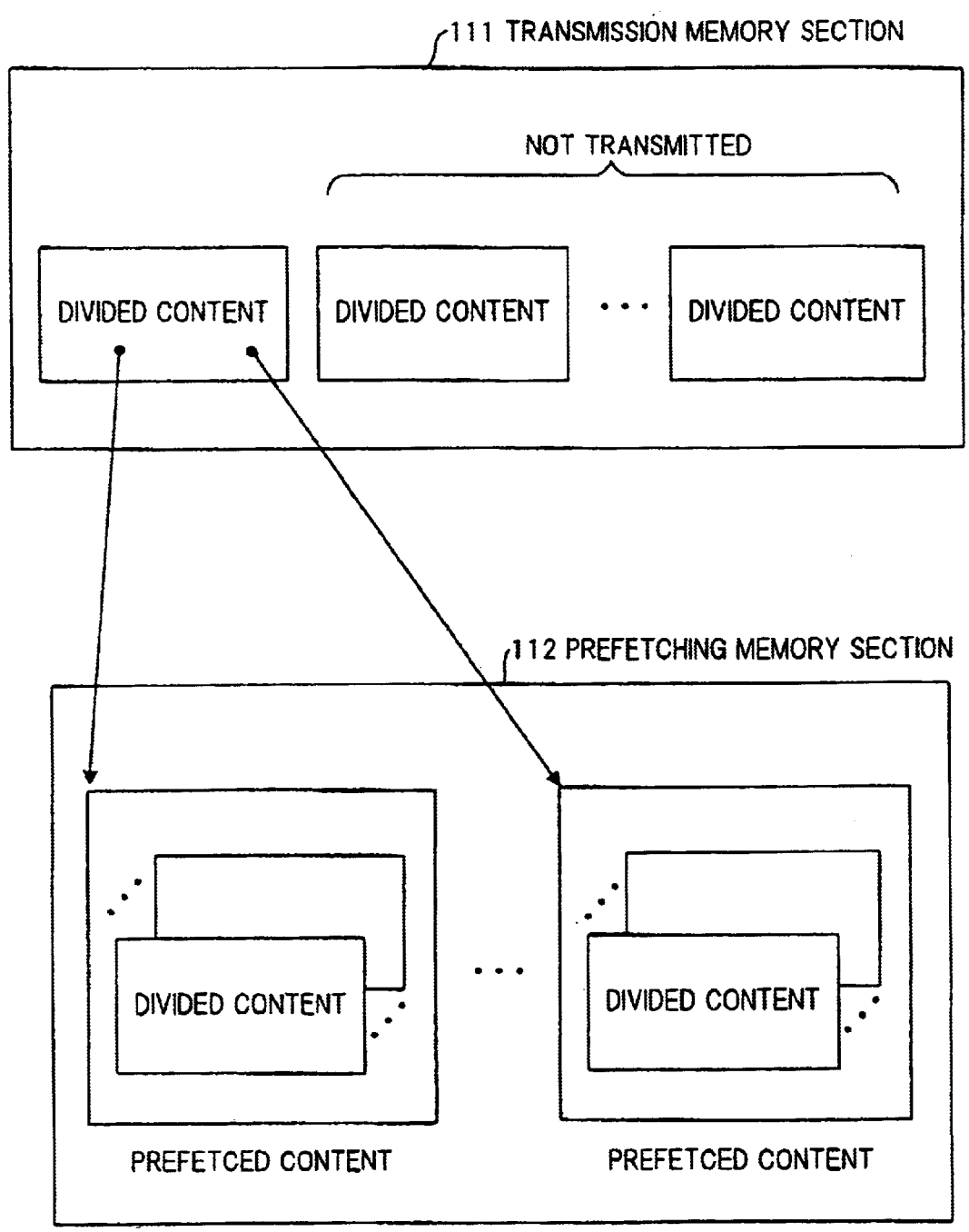
FIG. 6 shows the state of the transmission memory section and the prefetching memory section when one divided content of the content demanded to obtain from the portable terminal and the prefetching by this divided content unit is terminated.

FIG. 6 shows the state of the transmission memory section 111 and the prefetching memory section 112 when one divided content is sent to the portable terminal 2 about the content demanded by the portable terminal 2 to obtain, and the prefetching processing by this divided content is terminated. As shown in this drawing, the prefetching memory section 112 prefetches only the content (or possibly message) referred from the transmitted divided content, and contents referred from the divided content not transmitted yet to the portable terminal 2 are not prefetched at all.

Now, the operation of the time when the user of the portable terminal 2 on which the divided content is displayed demands to display the following divided content.

Suppose the divided content actually displayed by the user operation of the input apparatus 22 is the page 1, for example, when the user demands to display the following divided content, the browser 211 of the portable terminal 2 transmits the acquisition demand of the second page of the divided content to the gateway server 1 through the radio communication section 24. This divided content acquisition demand also specify the content URI and the terminal ID are specified.

Upon the reception of divided content acquisition demand from the portable terminal 2 through the radio communication section 12 (S1), the divided content supply section 14 of the gateway server 1 judges as acquisition demand of the other page than the content being transmitted, and searches if the content of that URI is stored in the content hold section 11 using the search section 15 (S2). As all divided contents of the content being transmitted and memorized in the transmission memory section 111, those stored in the transmission section ill are detected (YES in S3). The divided content supply section 14 fetches the divided content corresponding to the demanded page, from the transmission section 111, delivers the same with the terminal ID of the demanding portable terminal 2 to the radio communication section 12, and the radio communication section 12 transmits de divided content to the portable terminal 2 through the radio line 5 (S21 of FIG. 3).

On the portable terminal 2, the browser 211 memorizes temporarily the received divided content in a memory 212, and then displays on the browser screen of the display 23. On the other hand, the prefetching list creation section 16 of the gateway server 1 side inputs the divided content and the terminal ID delivered from the divided content supply section 14 to the radio communication section 12 similarly as before, and detects all link information to the other contents in that divided content (S22), and if one or more link information exist(s), a prefetching list enumerating URIs in respective link information is established (S24), and delivered to the prefetching section 17 with the terminal ID The prefetching section 17 proceeds the prefetching similarly as before, for each URI described in the prefetching list (S31 to S42). At this time, if content to prefetch is stored in the cache memory section 113 (YEN in S33) it is obtained from the cache memory section 113 and stored in the prefetching memory section 112 (S41). If it is the same content as the one stored in the prefetching memory section 112, (YES in S32), the perfecting is not required.

Now, the operation of the time when the user of the portable terminal 2 on which the divided content is displayed demands to obtain the content referred to from this content.

When the content referred to from the divided content actually displayed, is required by the user, the browser 211 of the portable terminal 2 transmits the acquisition demand of new content including the specified URI and the terminal ID of the portable terminal 2 to the gateway server 1 through the radio communication section 24 via the radio line 5.

Upon the reception of new content acquisition demand from the portable terminal 2 through the radio communication section 12 (S1), the divided content supply section 14 of the gateway server 1 searches if the content of that URI is stored in the content hold section 11 using the search section 15 (S2). As Shown in FIG. 6, all contents referred to from the divided content actually displayed are prefetched and memorized in the prefetching memory section 112. Therefore, they are judged to exist in the prefetching memory section 112 (YES in S4). Then, the divided content supply section 14 verifies if content or only message is stored in the prefetching memory section 112 (S51 in FIG. 5).

If content is stored, the content in the transmission section 111 is transferred to the cache memory section 113 (S52), said stored content is transferred from the prefetching memory section 112 to the transmission section 111 (553), the transmission section 111 is cleared, and it proceeds to the step S21 and transmits the leading head divided content, for example, to the terminal. Then, it proceeds to the prefetching processing.

On the other hand, if a message is stored, the message is transmitted to the portable terminal 2 through the radio communication section 12 (S55). Upon the reception of this message, the browser 211 of the portable terminal 2 stores temporarily in the memory 212, and then displays on the browser screen. This allows the user to know if the content they desired to obtain is pay content, access limited content or inaccessible content due to network trouble or the like. In this case, the used may resign to obtain the content, or demand the access knowing the situation. In the user input a message to resign the access by the operation o the input apparatus 22, the browser 211 transmits the same to the gateway server 1 through the radio communication section 24, the divided content supply section 14 identifies the access abandon (NO in S56) and transmits again the divided content that has been sent immediately before sending the message to the portable terminal 2, displaying again the last divided content data by the display 23 of the portable terminal 2 (S57).

Figure 2:
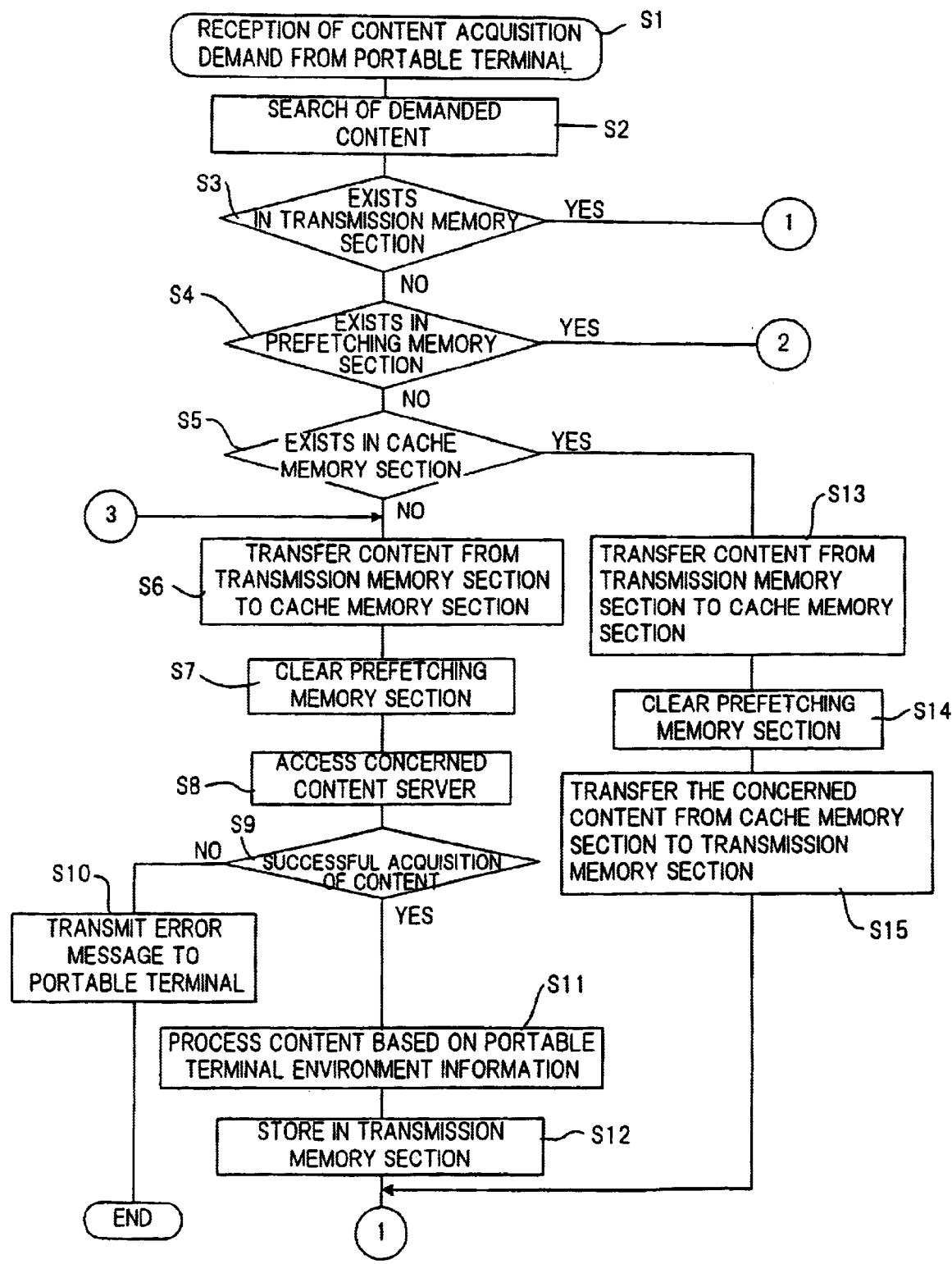
FIG. 2 is a flow chart showing a part of processing example by a gateway server in the first embodiment.
Figure 3:
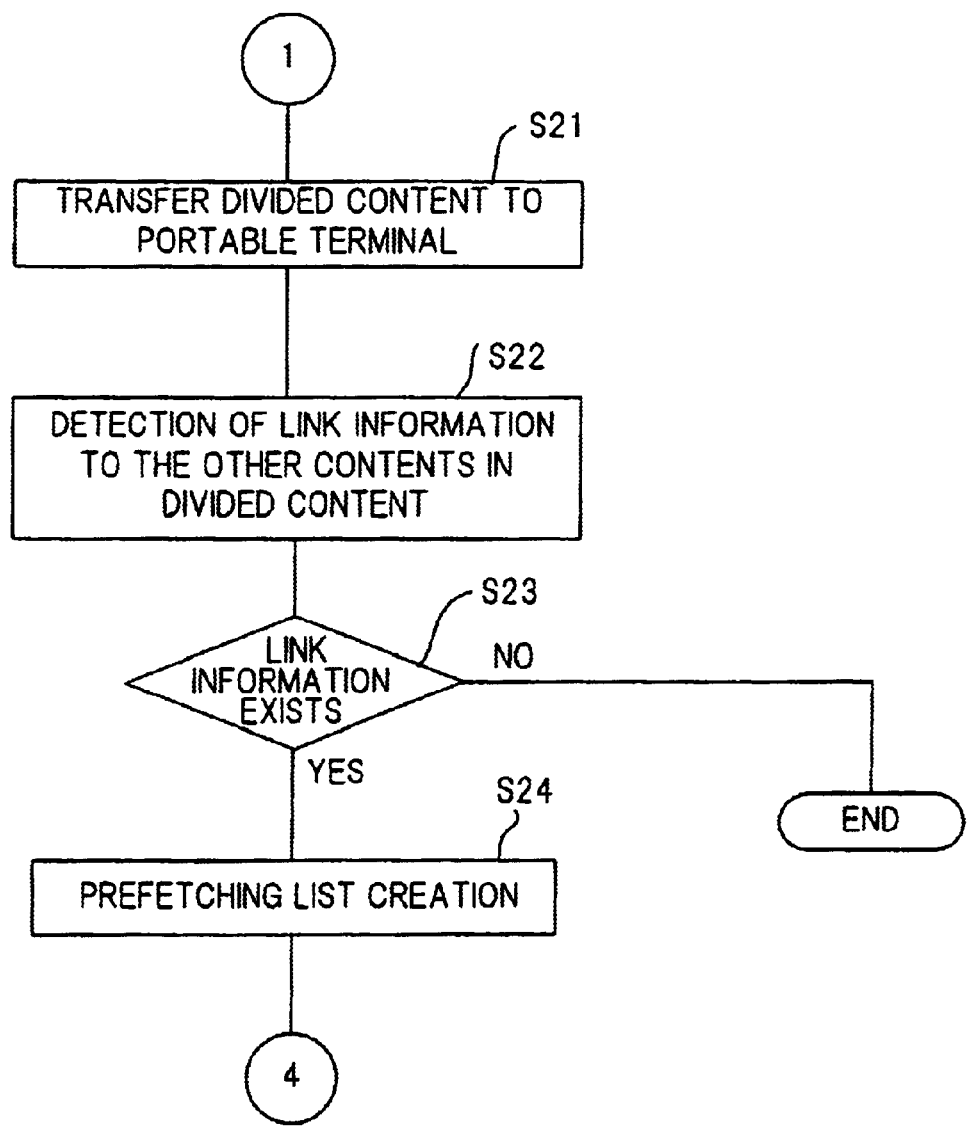
FIG. 3 is a flow chart showing a part of processing example by a gateway server in the first embodiment.

On the other hand, if the user designated to execute the access by the operation of the input apparatus 22, the browser 211 transmits the same to the gateway server 1, the divided content supply section 14 identifies the access execution abandon (YES in S56) and shifts the processing to the step S6 of FIG. 2. In other words, the content in the transmission section 111 is transferred to the cache memory section 113 (S6), the prefetching memory section 112 is cleared (S7), and the acquisition of the demanded content is tried again (S8). If the content is obtained successfully, the processing of shift to the step S11 is executed, and content processing, transmission of divided content to the terminal, and prefetching of the transmitted divided content are performed. If unsuccessful, an error message of the same is transmitted to the portable terminal 2 to terminate the processing. (S10)

The operation of the time when the user of the portable terminal 2 on which the divided content is displayed demands to obtain a content other than the content referred to from this divided content is substantially similar, however, as the demanded content is absent in the prefetching memory section 112, it is obtained from the cache memory section 113 if it exists therein, and if it does not exists, it is obtained from the concerned content server. If the content of the cache memory section 113 is to be used, the content in the transmission section 111 is transferred to the cache memory section 113 (S13), the prefetching memory section 112 is cleared (S14), and the concerned content is transferred from the cache memory section 113 to the transmission memory section 111 (S15).

The first embodiment has been described above. The aforementioned description has been focused on a single portable terminal 2 and its composition and operation were described; however, a plurality of portable terminals 2 may be connected to the gateway server 1. In this case, each portable terminal will be provided with a transmission memory section 111 and a prefetching memory section 112 of the content hold section 11. The cash memory section 113 may be common to all portable terminals 2 if the same processing shall be applied to all portable terminals 2, and if it is not the case, each portable terminal shall have their own ones, An embodiment wherein the cash memory section 113 is made common to all portable terminals 2 when the same processing is not applied to all portable terminals 2 will be described below.

[Second Embodiment]

Figure 7:
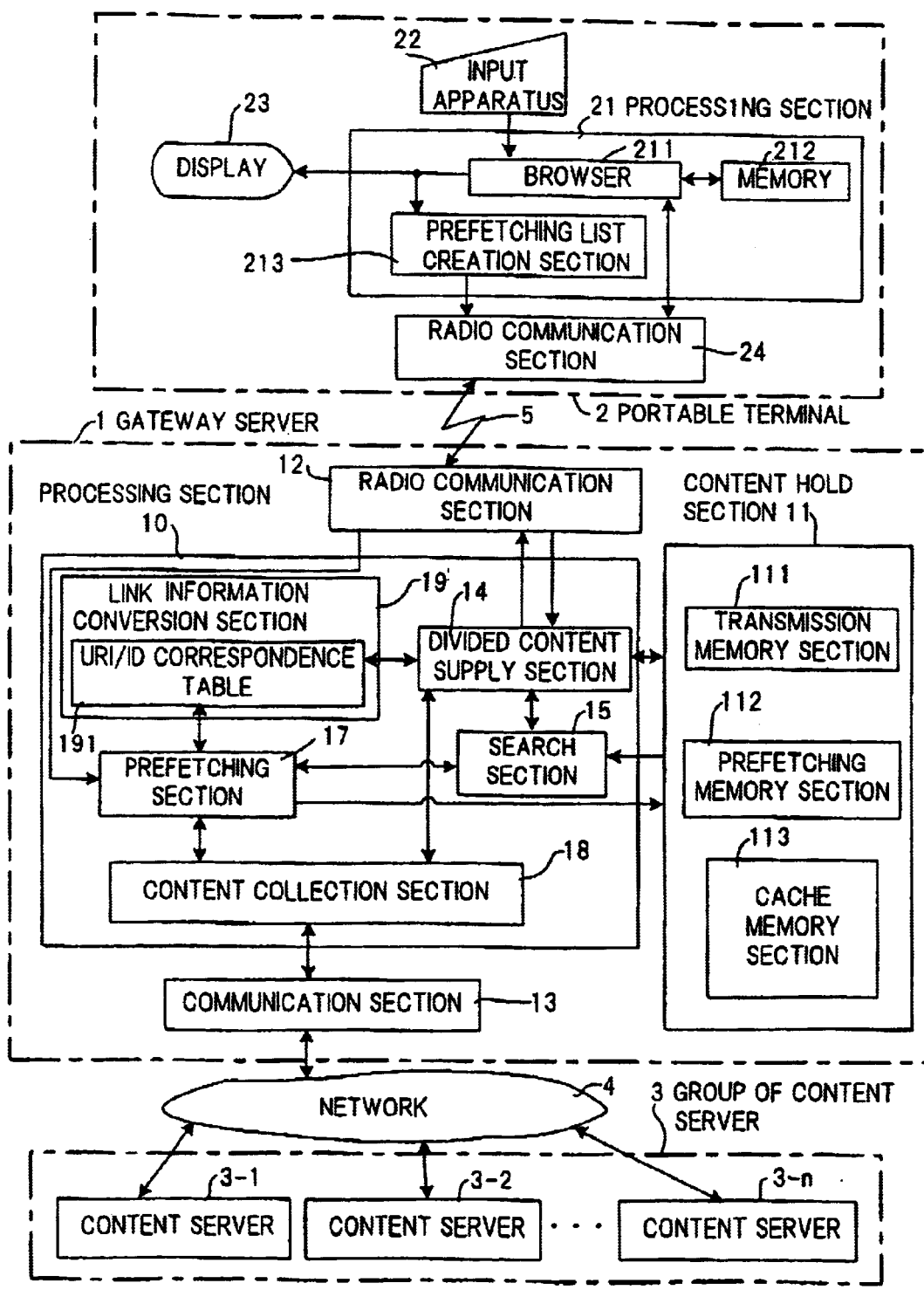
FIG. 7 is a composition diagram of a first embodiment of the content supply apparatus to which the present invention is applied.

Referring to FIG. 7, a second embodiment of the content supply apparatus applying the present invention is different from the first embodiment in that the portable terminal 2 side is provided with a prefetching list creation section 213 for creating the prefetching list at the portable terminal 2 side, and that the gateway server 1 side is provided with a link information format conversion section 19 for sending the link information in the divided content to be transmitted from the gateway server 1 to the portable terminal 2 in ID number format, and not in URI format.

In the ID number format, ID numbers corresponding one b one to the URI is adopted, for describing the link information with this ID number in place of URI. Sometimes, an URI may have a very long character number, and its information amount is not negligible, and increases communication time and communication cost. Therefore, in this embodiment, the information amount during the communication is reduced by replacing URI with ID number of smaller information amount, using ID numbers of the ad number of digits in the extent that an unique number can be adopted for respective content. For instance, an ID number of 8 bits will be enough if the maximum number of contents referred to from one divided content is about one thousand.

Figure 8:
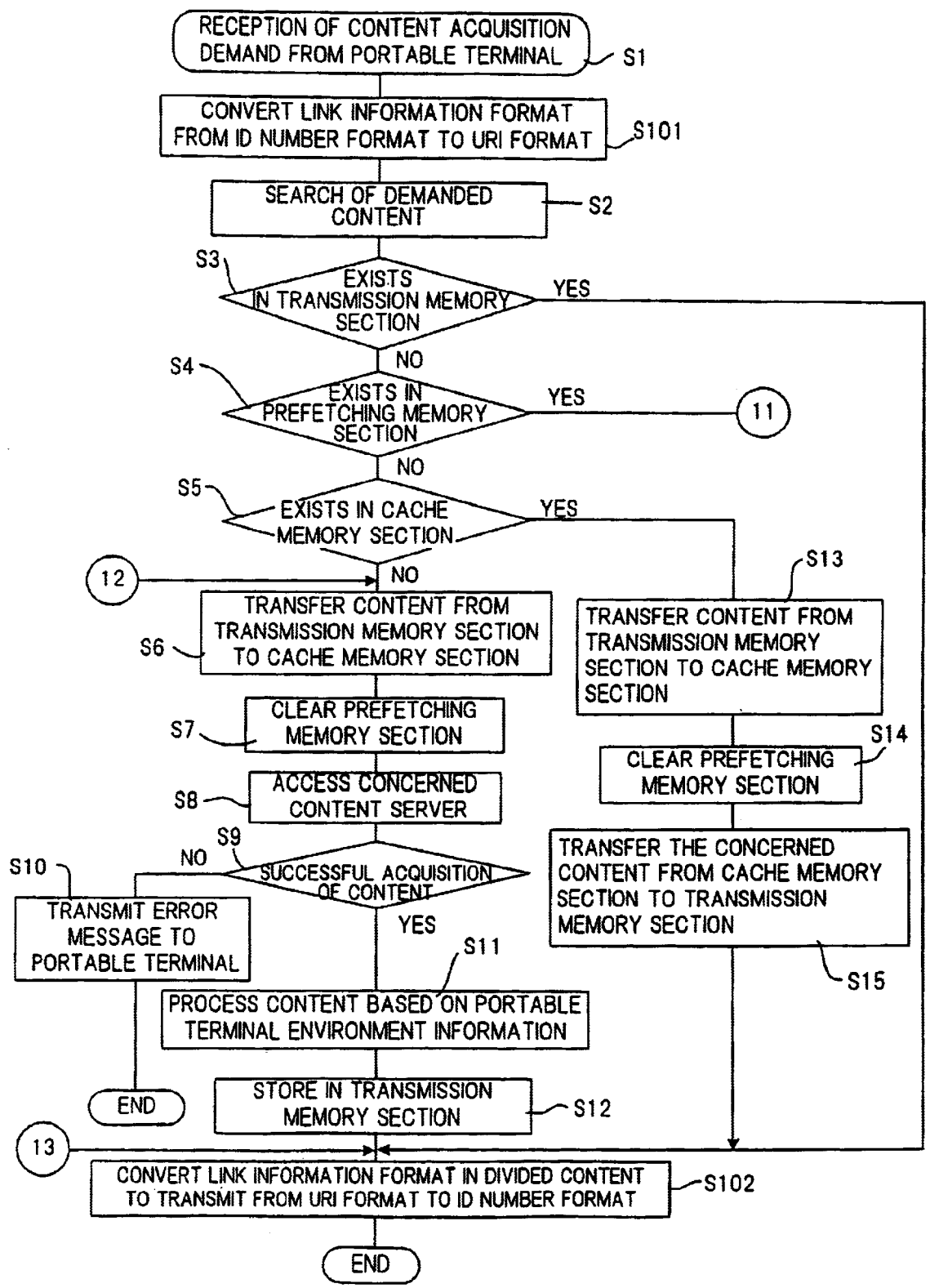
FIG. 8 is a flow chart showing a part of processing example by a gateway server in the second embodiment.
Figure 9:
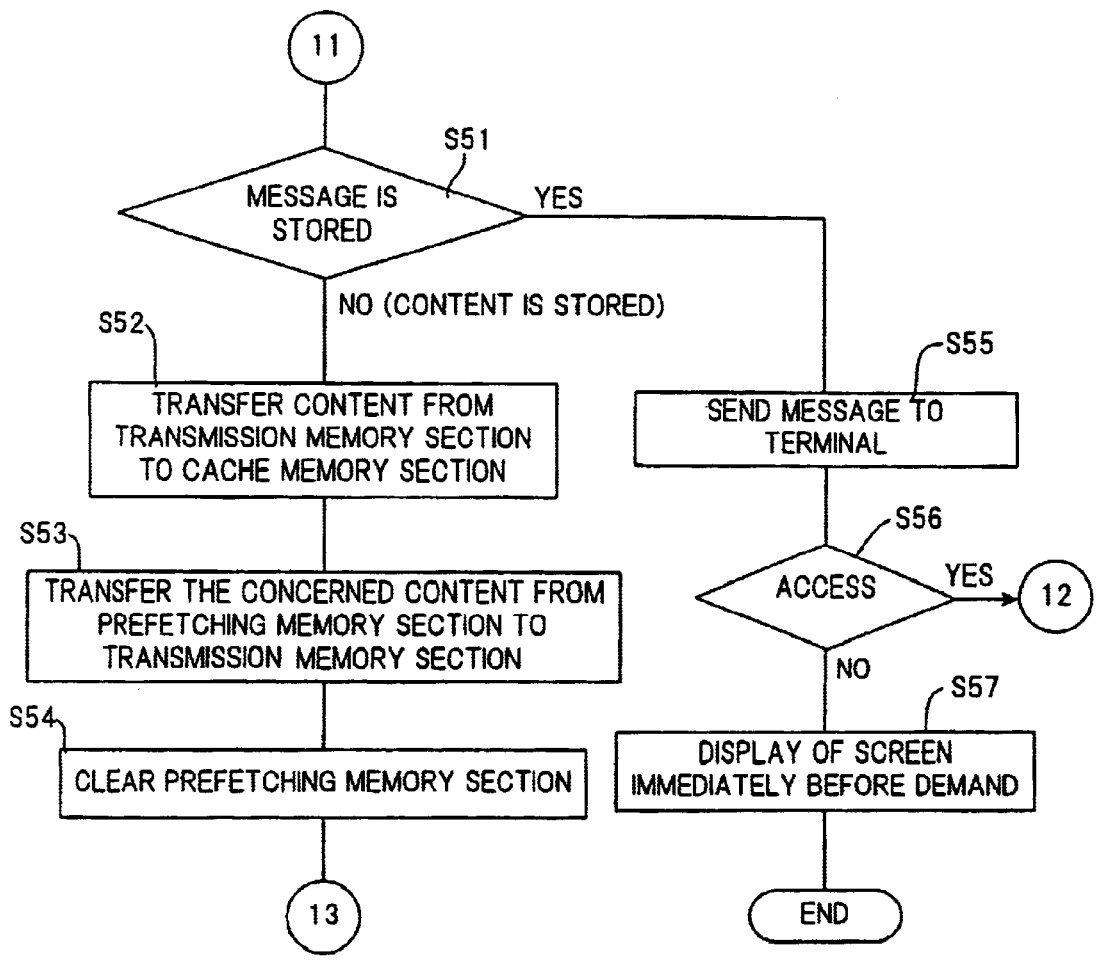
FIG. 9 is a flow chart showing a part of processing example by a gateway server in the second embodiment.
Figure 10:
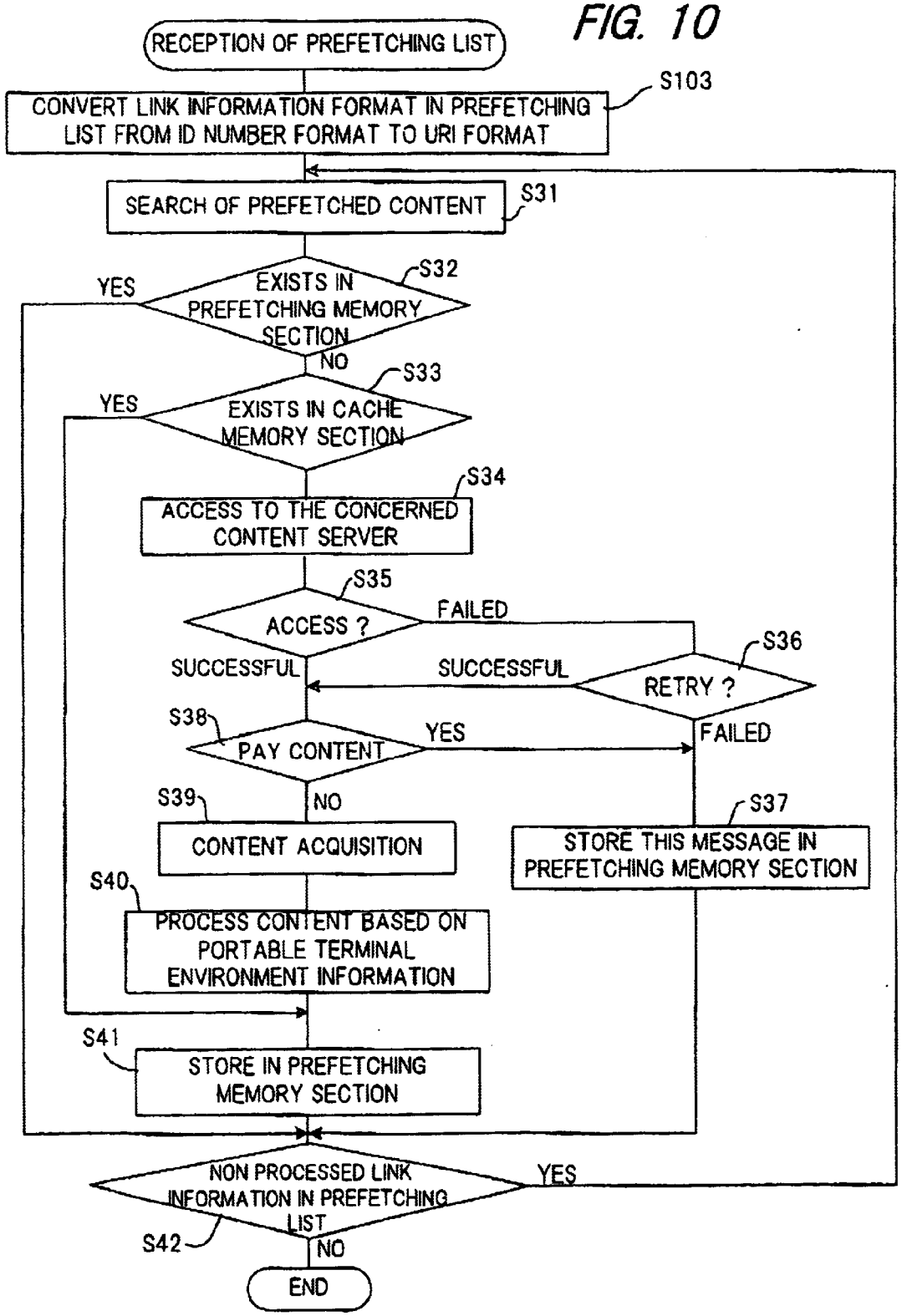
FIG. 10 is a flow chart showing a part of processing example by a gateway server in the second embodiment.
Figure 11:
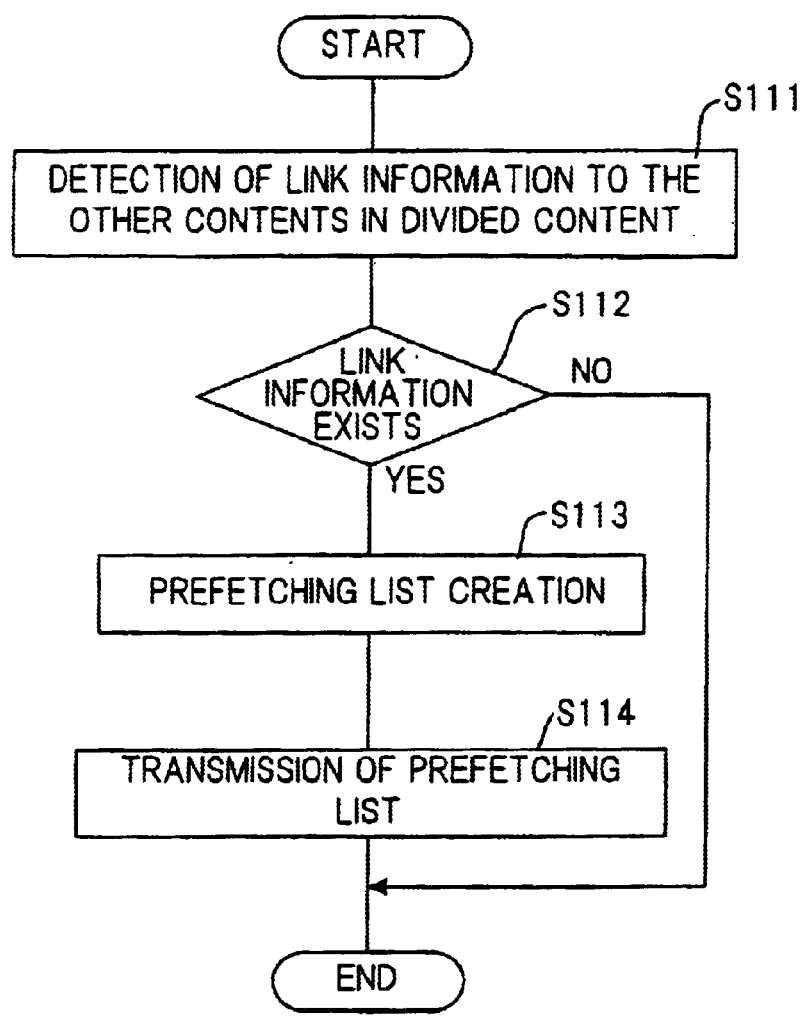
FIG. 11 is a flow chart showing a processing example by a prefetching list creation section of the portable terminal in the second embodiment.

FIG. 8 to FIG. 10 are flow charts showing a processing example of the gateway server 1 and FIG. 11 is a flow chart showing a processing example of the prefetching list creation section 213 of the portable terminal 2, and now, the operation of this embodiment will be described referring to FIG. 7 to FIG. 11 focusing on the difference with the first embodiment.

When the portable terminal 2 user designates the browser 211 to execute by specifying the communication destination URI, the is browser 211 transmits a new content acquisition demand including the specified URI and the terminal ID of the portable terminal 2 to the gateway server 1 through the radio communication section 24 via the radio line 5. Upon the reception of new content acquisition demand through the radio communication section 12 (S1), the divided content supply section 14 of the gateway server 1, converts the link information in the content acquisition demand into URI format (S101) using the link information conversion section 19, if the format if ID number format; but in this case, the conversion is not executed because it is in URI format. Thereafter, the content demanded to obtain is stored in the transmission memory section 111 as a plurality of divided contents through the processing similar to the first embodiment (S3 to S15, S51 to S54).

Then, the divided content supply section 14 delivers one divided content to be transmitted to the link information conversion section 19, makes all link information in URI format in the divided content converted into ID number format link information, and transmits the converted divided content to the portable terminal 2 trough the radio communication section 12 (S102). In the link information conversion section 19 clears one the inner URI/ID correspondence table 191, adopts one unique ID number each time one link information is detected from the divided content, replaces said detected URI format link information with this adopted ID number, and registers the set of this URI and this ID number in the inner URI/ID correspondence table 191.

In the portable terminal 2, the browser 211 once memorizes the divided content received by the radio communication section 24 in the memory 212, then displays on the browser screen of the display 23. The prefetching list creation section 213 inputs the divided content displayed on the browser screen by the browser 211, and detects all link information in URI format to the other contents in the divided content (S111). If no link information is detected (NO in S112), the processing is terminated, and if one or more link information is detected, a prefetching list enumerating ID numbers in respective link information is established (S113), and transmitted to the gateway server 1 through the radio communication section 24 (S114).

When the radio communication section 12 of the gateway server 1 receives the prefetching list, it delivers the same to the prefetching section 17. The prefetching section 17 delivers the received prefetching list to the link information conversion section 19 to make all ID numbers in the prefetching list converted into URI (S103). At this time, the link information conversion section 19 finds the concerned URI by searching in the inner URI/ID correspondence table 191 for each ID number in the prefetching list, and replaces the corresponding ID number in the prefetching list with this URI. Thus, the prefetching section 17 prefetches by the same procedure as the first embodiment, based on the prefetching list converted into URI format (S31 TO S42).

When the user operation demands to obtain a content referred to from the divided content being displayed, the browser 211 of the portable terminal 2 transmits a new content acquisition demand including the specified link information (in this case, link information in ID number format) to the gateway server 1 through the radio communication section 24 via the radio line 5. The divided content supply section 14 of the gateway server 1 delivers the ID number of the new content acquisition demand from the portable terminal 2 to the link information conversion section 19, and make it converted into URI (S101). At this time, the link information conversion section 19 searches in the inner URI/ID correspondence table 191 with the delivered IR, find the corresponding URI and returns it. The divided content supply section 14 performs the new content acquisition based on the converted URI according to the same procedure as mentioned above.

Thus, the second embodiment is described above. The aforementioned description has been focused on a single portable terminal 2 and its composition and operation were described; however, a plurality of portable terminals 2 may be connected to the gateway server 1. In this case, each portable terminal will be provided of a transmission memory section 111 and a prefetching memory section 112 of the content hold section 11, and the inner URI/ID correspondence table 191. The cash memory section 113 may be common to all portable terminals 2 if the same processing shall be applied to all portable terminals 2, and if it is not the case, each portable terminal shall have their own ones.

[Other Embodiment]

Now, the other embodiments of the present invention will be described.

Figure 4:
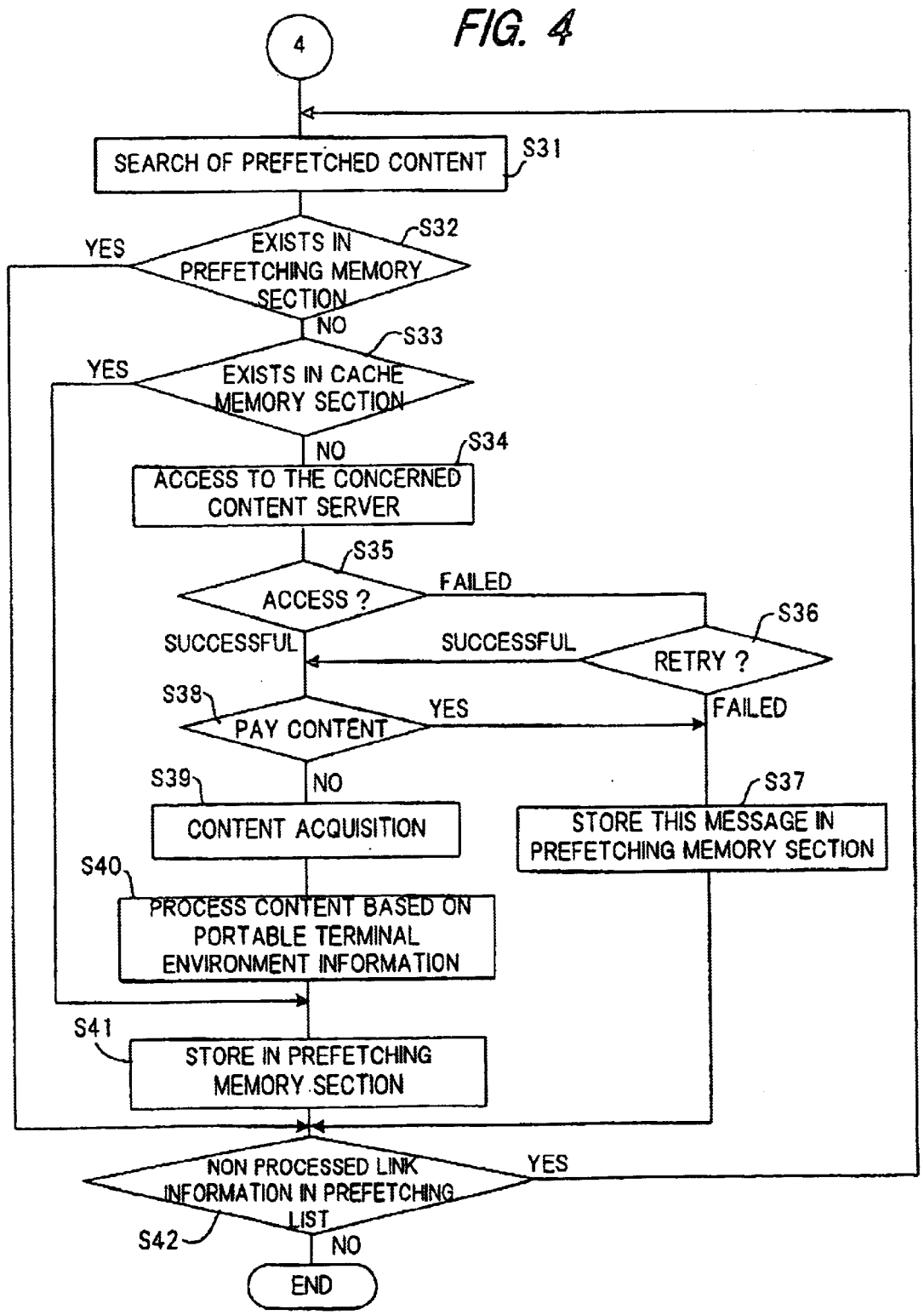
FIG. 4 is a flow chart showing a part of processing example by a gateway server in the first embodiment.
Figure 5:
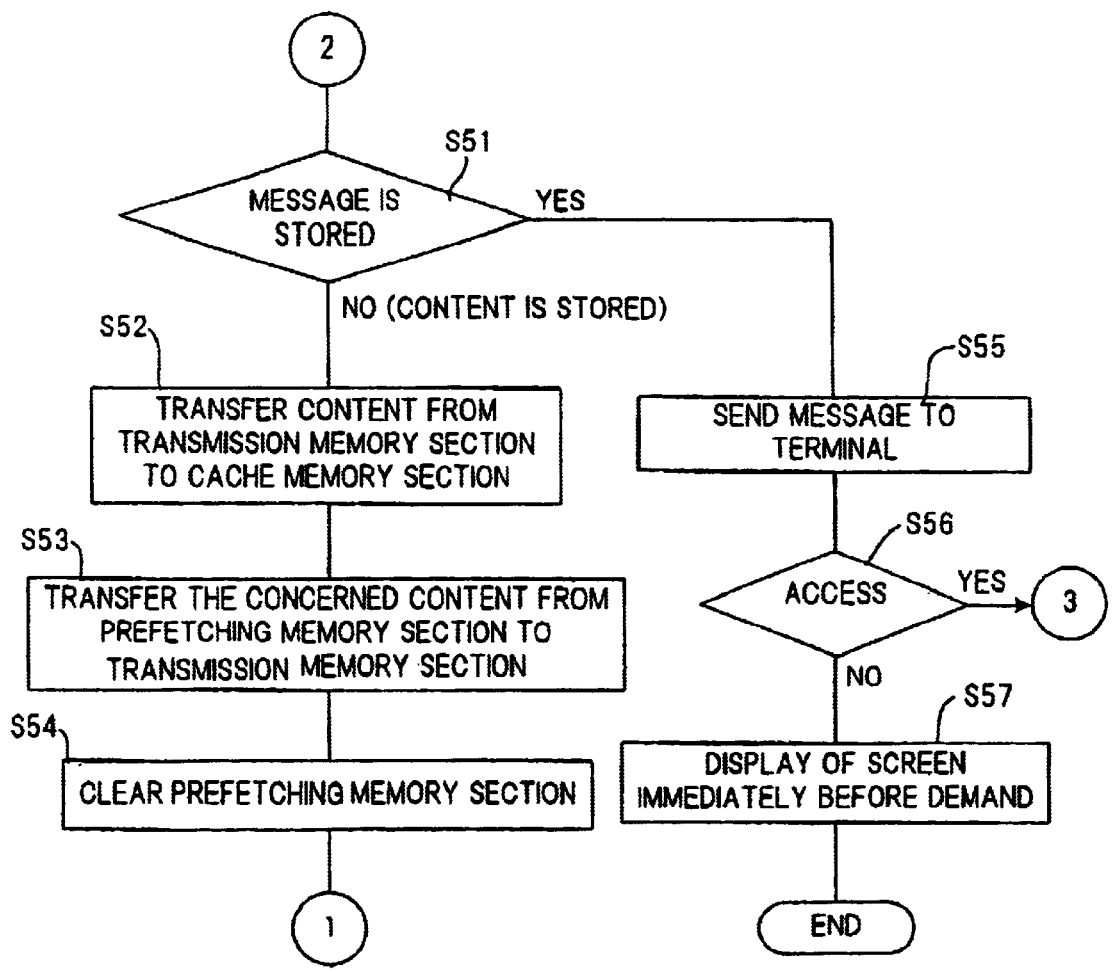
FIG. 5 is a flow chart showing a part of processing example by a gateway server in the first embodiment.
Figure 12:
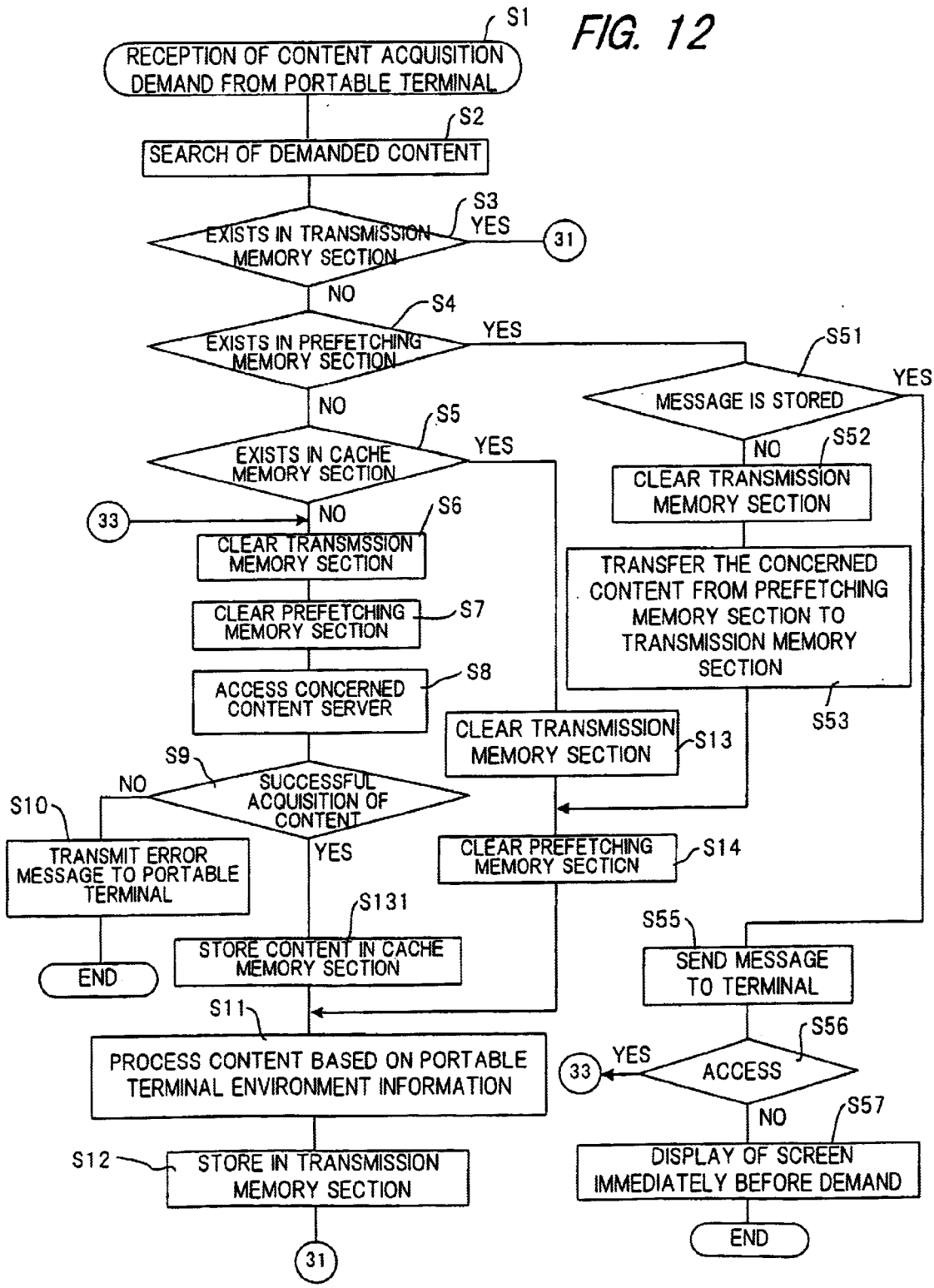
FIG. 12 is a flow chart showing a part of processing example by a gateway server in another embodiment of the present invention.
Figure 13:
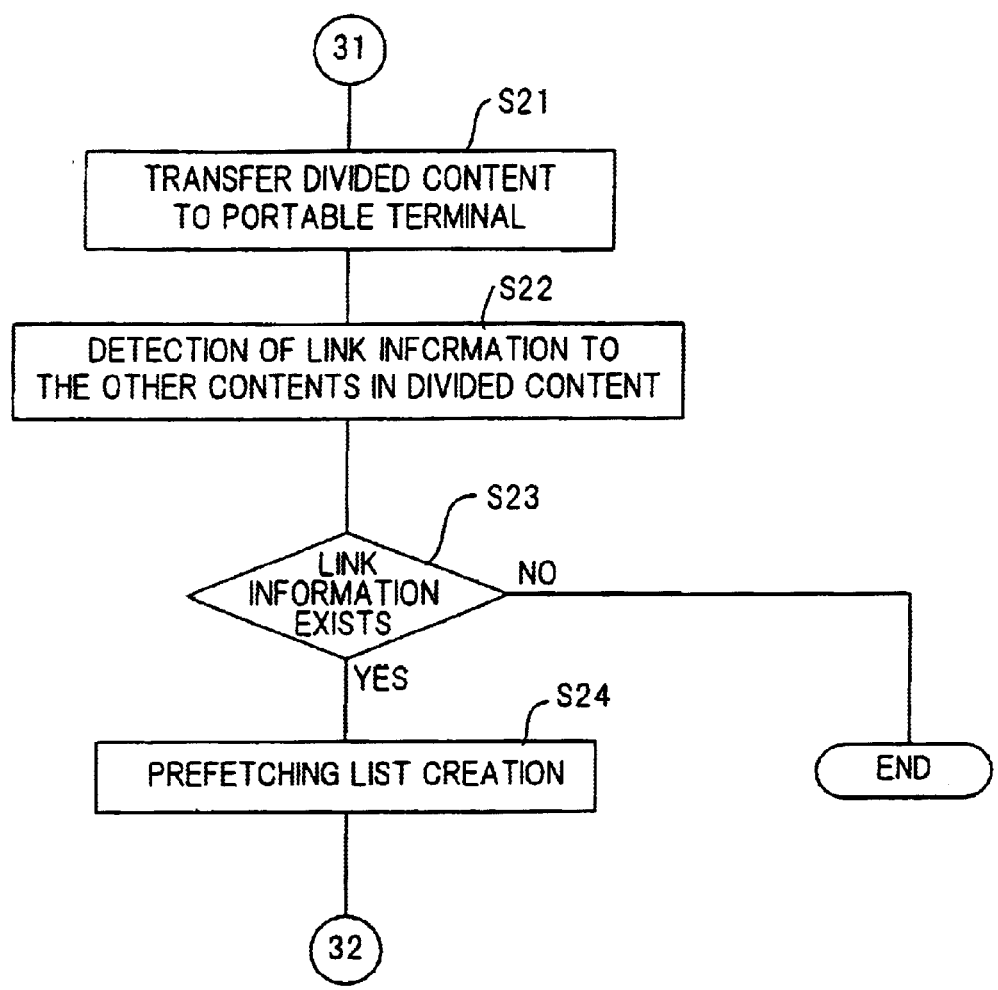
FIG. 13 is a flow chart showing a part of processing example by a gateway server in another embodiment of the present invention.
Figure 14:
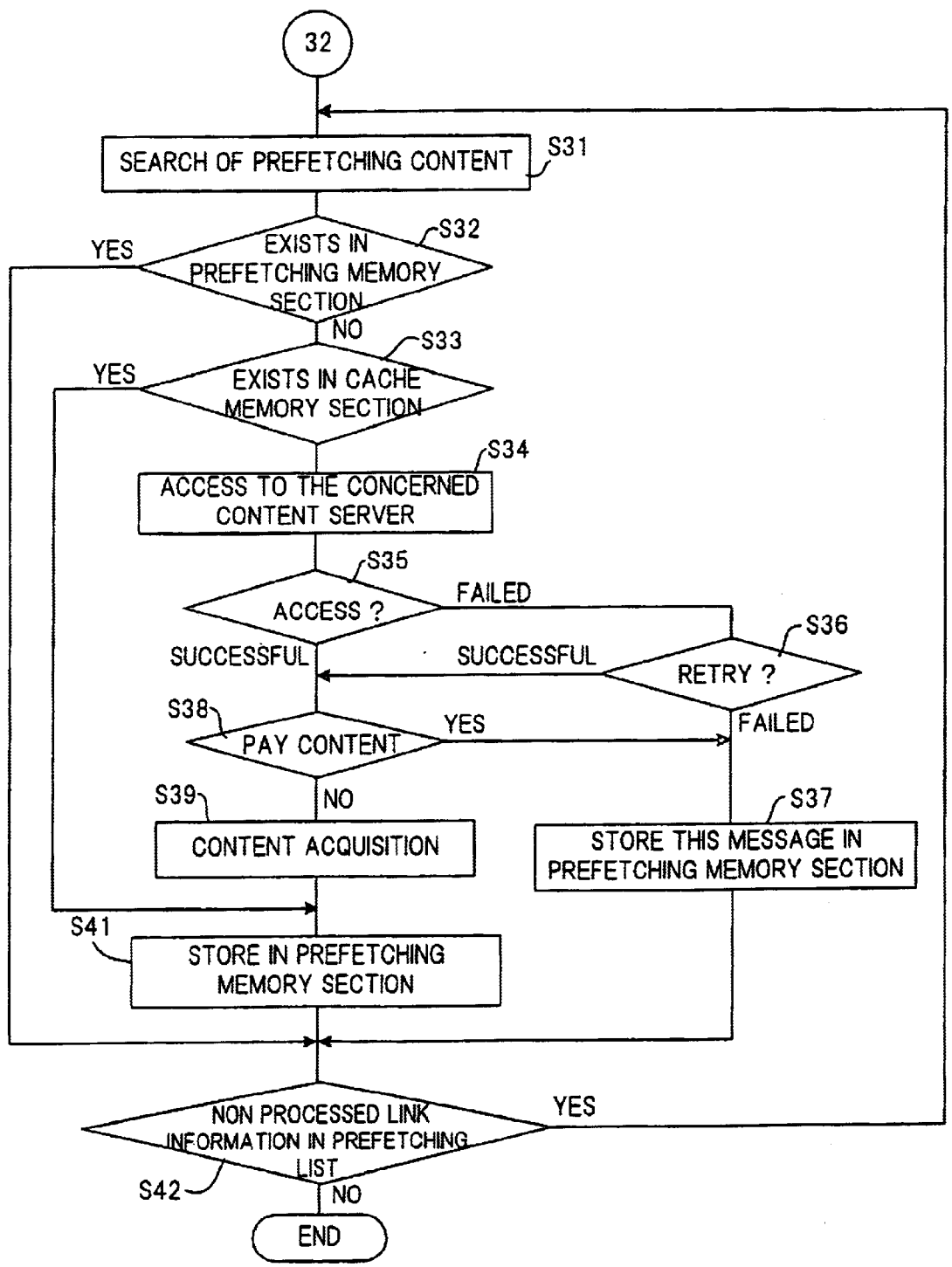
FIG. 14 is a flow chart showing a part of processing example by a gateway server in another embodiment of the present invention.

(1) In respective embodiment mentioned above, division or other processing of the prefetched content have been performed beforehand; however, they may be performed immediately before sending the first divided content to the portable terminal 2. At this time, the cache memory section 113 can be made common to all portable terminals even when the processing contents are not identical to all portable terminals, by caching the content before the processing in the cache memory section 113. A processing example of the gateway server 1 wherein the aforementioned modification is applied to the first embodiment is shown in FIG. 12 to FIG. 14 (applicable similarly to the second embodiment). As shown in FIG. 14, the step S40 of FIG. 4 is omitted, and the content before the processing is prefetched in the prefetching memory section 112. As the result, as shown in FIG. 12, the content is processed before the transmission (S11) if the content whose acquisition is demanded by the portable terminal 2 exists in the cache memory section 113 (YES in S5), and exists in the prefetching memory section 112 (YES IN S4, NO in S5), and preceding that transmission, it carried out the processing of the content (S11). Besides, a supplementary step S131 for storing the content before processing into the cache memory section 113 is added, the processing of steps S6, S14 is replaced by the clear processing of the transmission memory section 111, and the processing of the step S53 is modified to the processing of transferring the content from the prefetching memory section 112 to the cache memory section 113 and the transmission memory section 111.

(2) The composition to convert the link information in URI format in the content to ID number format can be applied not only to the embodiment wherein the prefetching list is established by the portable terminal 2 side, but to the embodiment wherein the prefetching list is established by the gateway server 1.

(3) In respective embodiment mentioned above, all contents referred to from the divided content being displayed on the portable terminal 2, it is also possible to select or give priority order to the content to be prefetched. For instance, in general, contents in the same content sever are often those following he content displayed actually or related contents; therefore, the prefetching section 17 may prefetch only URIs in the same content server among URIs in the prefetching list, or prefetch giving priority that the content of the other content servers, by recognizing by the gateway server 1 the content server storing the content being displayed actually by the portable terminal 2. In this case, the first embodiment may enumerate only URIs in the same content server at the stage of prefetching list creation by the prefetching list creation section 16, or give the priority order. Otherwise, the user operation history, taste, or the like ma be held by the portable terminal 2 or the gateway server 1 side, and the priority decision or the selection can be performed base on this information to establish the prefetching list.

Figure 15:
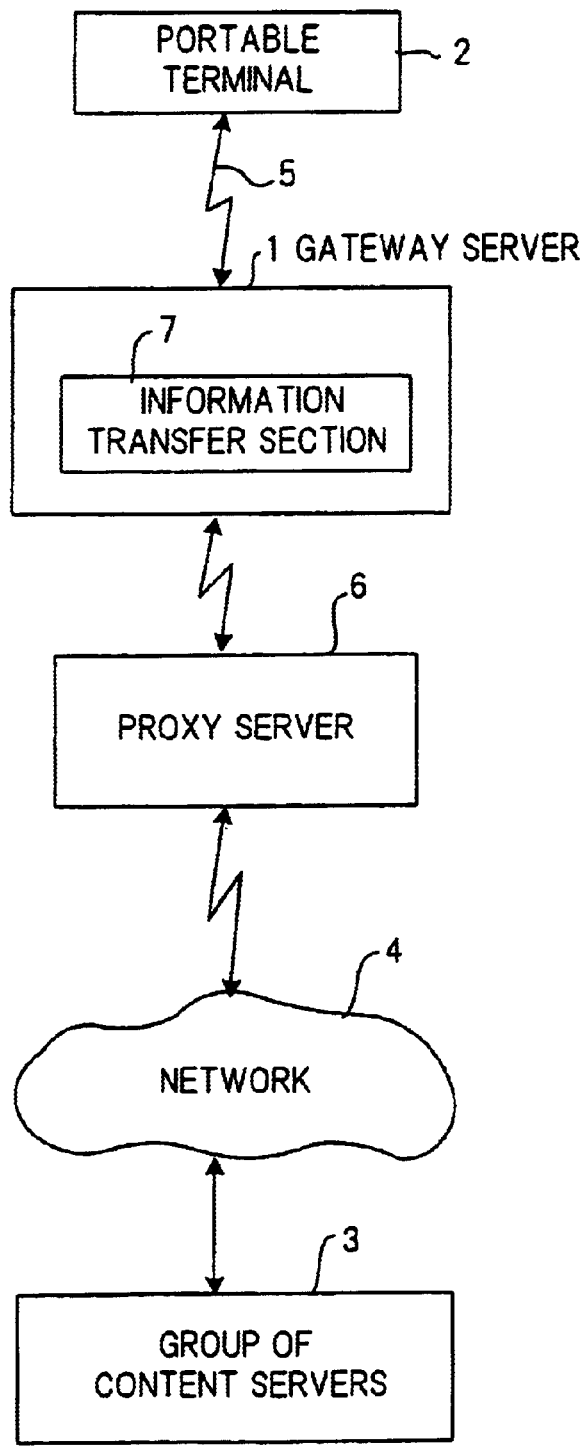
FIG. 15 is a composition diagram of the content supply apparatus of the another embodiment of the present invention.

(3) As shown in FIG. 15, when a gateway server 1 and a proxy sever 6 that can communicate with this gateway server 1 and a group of content servers 3 are interposed between the portable terminal 2 and the group of content servers 3, the composition in the gateway server 1 described for said respective embodiment may be installed in the proxy server 6 in place of gateway server 1. In this case, the gateway server 1, by using an information transfer section, controls the transfer of the content acquisition demand or the like transmitted from the portable terminal 2 to the proxy server 6 and the transfer of response date from the proxy server 6 to the portable terminal 2.

(4) The content accumulated in the content server is not limited to HTML file, but it may be image file, animation file, sound file, or any other content.

(5) In the aforementioned embodiment, it has been supposed that the prefetching has been terminated at the content supply apparatus side, such as gateway server, when the portable terminal 2 demands the acquisition of the other contents referred to from the content displayed actually. However, in some cases, the prefetching may not have been terminated. In this case, the prefetching may be suspended or terminated to give priority to the processing of the demand from the portable terminal 2.

(6) In respective embodiment, if the content to prefetch is already stored in the content hold section 11, it has been used for prefetching processing, however, it may be reloaded from the group of contents.

As mentioned above, the present invention allows to reduce the time from the content acquisition operation by the portable terminal user to the actual transmission of the content to the portable terminal and the display thereof, and to avoid useless content prefetching.

Also, in the composition to convert URI format link information into ID number format, the transfer information amount between the portable terminal and the content supply apparatus reduces as much, and the communication time is shortened, and the communication charge can be saved.

Further, in the composition, wherein, if the content to prefetch is either pay content, access restricted content, or content that could not be prefetched due to network trouble or other reason, this message is stored in place of prefetched content, and the portable terminal user demands to obtain such content, said message is transmitted to the portable terminal, the portable terminal user can know beforehand the content in trouble, pay content, or access limited content, and to dispense with useless access and useless payment of communication fee.

What is claimed is:

1. A content supply apparatus, interposable between a portable terminal and a content server, for obtaining content demanded by the portable terminal and sending the obtained content to the portable terminal, said content supply apparatus comprising:

a content holding section for holding content obtained from the content server;

a divided content supply section for obtaining the demanded content from said content holding section if the demanded content exists in said content holding section, and obtaining the demanded content from the content server if the demanded content does not exist in said content holding section, and for transmitting the obtained content to the portable terminal in divided content units of a maximum information amount that can be displayed by the portable terminal; and a prefetcher section for prefetching other contents, referred from the transmitted divided content units, from the content server, and storing the prefetched content in said content holding section, wherein said content holding section includes a transmission memory section for holding contents supplied to the portable terminal, a prefetch memory section for holding prefetched content, and a cache memory section for holding content the portable terminal had obtained previously.

2. The content supply apparatus of claim 1, further comprising:

a link information format conversion section for mutual conversion of URI format link information and ID number format link information;

wherein said divided content supply section transmits link information in the transmitted divided content units to the portable terminal by substituting an ID number format provided by said link information format conversion section for a corresponding URI when the portable terminal demands use of the ID number format.

3. The content supply apparatus of claim 1, further comprising:

a prefetch list creation section for detecting link information to the other contents contained in the transmitted divided content units, and for establishing a prefetch list and delivering the established prefetch list to said prefetcher section.

4. The content supply apparatus of claim 1, wherein:

said prefetcher section prefetches according to a prefetch list transmitted from the portable terminal.

5. The content supply apparatus of claim 1, wherein:

if the content to be prefetched is either content under pay content access restriction, or content that could not be prefetched due to network trouble or other reason, said prefetcher section stores a message in said content holding section matched against the concerned content URI, and said divided content supply section receives the stored message during a search for the content demanded by the portable terminal and transmits the received message to the portable terminal.

* * * * *